US008765660B1

(12) United States Patent
Li et al.

(10) Patent No.: US 8,765,660 B1
(45) Date of Patent: Jul. 1, 2014

(54) SEPARATION OF SURFACTANTS FROM POLAR SOLIDS

(71) Applicant: Rive Technology, Inc., Boston, MA (US)

(72) Inventors: Kunhao Li, Princeton, NJ (US); Barry Speronello, Montgomery Township, NJ (US)

(73) Assignee: Rive Technology, Inc., Boston, MA (US)

( * ) Notice: Subject to any disclaimer, the term of this patent is extended or adjusted under 35 U.S.C. 154(b) by 6 days.

(21) Appl. No.: 13/790,903

(22) Filed: Mar. 8, 2013

(51) Int. Cl.
*C11D 3/08* (2006.01)

(52) U.S. Cl.
USPC ........ 510/507; 510/511; 423/328.1; 423/700; 423/716; 423/717

(58) Field of Classification Search
USPC ........ 510/507, 511; 423/328.1, 700, 716, 717
See application file for complete search history.

(56) References Cited

U.S. PATENT DOCUMENTS

| | | | |
|---|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |

(Continued)

FOREIGN PATENT DOCUMENTS

| | | |
|---|---|---|
| JP | 2002128517 | 5/2002 |
| JP | 2004143026 | 5/2004 |

(Continued)

OTHER PUBLICATIONS

Al-Khattaf, S. et al., The Role of Diffusion in Alkyl-Benzenes Catalytic Cracking, Appl. Catal. A: Gen. 226; 139-153, (2002).
Bagri, R. et al.; Catalytic Pyrolysis of Polyethylene; Anal. Pyrolysis, 63:29-41 (2002).
Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).
CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.

(Continued)

*Primary Examiner* — Charles Boyer
(74) *Attorney, Agent, or Firm* — Hovey Williams LLP

(57) ABSTRACT

Methods for removing surfactants from polar solids are described herein. In particular, various embodiments described herein relate to the removal of surfactants from polar solids that involves contacting a surfactant-containing porous polar solid with an extraction agent comprising water, a salt, and, optionally, a polar organic compound. In certain embodiments described herein, the extraction agents are used to remove surfactants from a mesoporous zeolite.

32 Claims, No Drawings

(56) References Cited

U.S. PATENT DOCUMENTS

| | | | |
|---|---|---|---|
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0074397 A1* | 4/2005 | Pinnavaia et al. ............ 423/705 |
| 2005/0130827 A1 | 6/2005 | Schunk |
| 2005/0214539 A1 | 9/2005 | Ying et al. |
| 2006/0078487 A1 | 4/2006 | Endo et al. |
| 2007/0244347 A1 | 10/2007 | Ying et al. |
| 2008/0214882 A1* | 9/2008 | Pinnavaia et al. ............ 585/653 |
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2010/0255103 A1* | 10/2010 | Liong et al. ................. 424/489 |
| 2011/0118107 A1 | 5/2011 | Garcia-Martinez |
| 2011/0171121 A1 | 7/2011 | Senderov et al. |
| 2012/0021034 A1* | 1/2012 | Zink et al. ..................... 424/421 |
| 2012/0181163 A1* | 7/2012 | Inagaki et al. ........... 204/157.45 |
| 2013/0183229 A1* | 7/2013 | Garcia-Martinez .......... 423/700 |

FOREIGN PATENT DOCUMENTS

| | | |
|---|---|---|
| WO | 2001017901 | 3/2001 |
| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Davis, M.E., Ordered Porous Materials for Emerging Applications, Nature, 417:813-821 (2002).

Davis, M.E., Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

(56) References Cited

OTHER PUBLICATIONS

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular—Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434, Jun. 22, 2000.

Tao et al., ZSM-5 Monolith of Uniform Mesoporous Channels, Material Sciences, Chiba University, J. AM. Chem. Soc., Japan 2003, pp. 6044-6045.

\* cited by examiner

SEPARATION OF SURFACTANTS FROM POLAR SOLIDS

BACKGROUND

1. Field

One or more of the embodiments described herein relate to methods for removing a surfactant from a surfactant-containing polar solid.

2. Description of Related Art

Surfactants are commonly used for a variety of applications, including being used as, for example, cleaning agents, biocides, and chemical processing agents for the creation of mesoporous solids. Surfactants, particularly cationic surfactants, are known to strongly adhere to polar solid surfaces, especially solid surfaces having cation exchange capacity. As a result, surfactants can be particularly difficult to remove from polar solids. Even though advances have been made in the art of surfactant removal, improvements are still needed to more effectively remove surfactants from polar solids.

SUMMARY

One embodiment of the present invention concerns a method for removing a surfactant from a polar solid. This particular method comprises contacting a surfactant-containing porous polar solid with an initial extraction agent under conditions sufficient to remove at least a portion of the surfactant from the pores of the surfactant-containing polar solid. In such an embodiment, the initial extraction agent can comprise water and a salt.

Another embodiment of the present invention concerns a method for removing a surfactant from a mesoporous zeolite. This particular method comprises: (a) contacting a surfactant-containing mesoporous zeolite with an initial extraction agent under conditions sufficient to remove at least a portion of a cationic surfactant from the pores of the surfactant-containing mesoporous zeolite to thereby provide a treated mesoporous zeolite and a surfactant-containing extraction agent, wherein the initial extraction agent comprises water, a salt, and a polar organic compound and is capable of at least partially solubilizing the cationic surfactant, wherein the surfactant-containing extraction agent comprises at least a portion of the water, at least a portion of the salt, at least a portion of the polar organic compound, and at least a portion of the cationic surfactant initially present in the pores of the surfactant-containing mesoporous zeolite; and (b) separating the treated mesoporous zeolite from the surfactant-containing extraction agent to thereby provide a recovered mesoporous zeolite and a spent extraction agent, wherein the weight ratio of the amount of the cationic surfactant present in the pores of the recovered mesoporous zeolite to the amount of the cationic surfactant present in the pores of the surfactant-containing mesoporous zeolite is not more than 0.9:1.

DETAILED DESCRIPTION

The embodiments described herein are directed to methods for removing a surfactant from a surfactant-containing polar solid. In particular, various embodiments described herein concern methods for removing surfactants from specific porous polar solids such as, for example, mesoporous zeolites. As discussed in further detail below, at least a portion of the surfactant contained within the pores of a polar solid may be removed by contacting the polar solid with an extraction agent that is capable of at least partially solubilizing the surfactant.

Polar Solids and Surfactants

A "polar solid," as used herein, includes any solid having (1) one or more of the following characteristics: (a) cation exchange capacity, (b) at least two different types of cations, and/or (c) at least two different types of anions and (2) sufficient polarity so that it is capable of strongly absorbing at least 1 weight percent of a surfactant based on the total weight of the polar solid. As used herein, "strong adsorption" is defined by a test in which particles of the polar solid are slurried in an aqueous solution comprising the surfactant in an amount equaling at least 25 percent of the weight of the solid, filtered to form a filter cake, and then washed with three volumes of deionized water at a temperature of 70 to 80° C. The resulting washed filter cake is then analyzed for surfactant content using a Thermogravimetric Analyzer ("TGA"). Consequently, the solid is considered a polar solid if the surfactant content of the washed solid is at least 1 percent by weight. In certain embodiments, the polar solid is sufficiently polar so as to be capable of strongly absorbing at least 2, 3, 5, 10, 15, 20, or 25 weight percent of a surfactant based on the total weight of the polar solid.

In certain embodiments, the polar solid comprises a molecular sieve. In such embodiments, the polar solid can be a molecular sieve having cation exchange capacity.

In certain embodiments, the polar solid comprises a mesostructured inorganic material.

In one or more embodiments, the polar solid is selected from the group consisting of aluminates, silicates, zeolites, and combinations thereof. In another embodiment, the polar solid comprises a silicate. In yet another embodiment, the silicate can comprise a layered metalosilicate. In such embodiments, the layered metalosilicates can be selected from the group consisting of talc, clays, and combinations thereof.

In one or more embodiments, the polar solid comprises a zeolite. In such embodiments, the zeolite can be selected from the group consisting of zeolite A, faujasite, mordenite ("MOR"), CHA, ZSM-5 ("MFI"), ZSM-12, ZSM-22, beta zeolite, synthetic ferrierite ("ZSM-35"), synthetic mordenite, and combinations thereof. In certain embodiments, the polar solid comprises a mesoporous zeolite. In other embodiments, the polar solid comprises a mesostructured zeolite. Mesoporous and mesostructured zeolites and their methods of production are further described in U.S. Pat. No. 7,589,041; U.S. Pat. No. 8,206,498; U.S. Patent Application Publication No. 2007/0244347; U.S. Patent Application Publication No. 2010/0190632; U.S. Patent Application Publication No. 2010/0196263; U.S. Patent Application Publication No. 2011/0171121; U.S. Patent Application Publication No. 2011/0118107; and U.S. Non-Provisional application Ser. No. 13/440,781; the entire disclosures of which are incorporated herein by reference.

In certain embodiments, the polar solid is in the form of particles. In such embodiments, at least 20, 40, 60, 80, 90, or 99 weight percent of the particles have an average particle diameter of at least 1, 10, 50, 75, or 100 nm and/or not more than 1,000, 750, 500, 250, or 100 μm.

In certain embodiments, the polar solid is porous. In such embodiments, the total volume per gram of pores having diameters between 20 to 80 Å can be at least 0.05, 0.06, 0.07, 0.08, 0.09, or 0.1 cc/g.

In various embodiments, the polar solids comprise one or more surfactants. These surfactants can be derived from a number of prior art processes such as, for example, the pore-forming reactions described in U.S. Pat. No. 7,589,041, which has been incorporated by reference. In one or more embodiments, the polar solids can have a total surfactant content of at least 1, 2, 3, 4, 5, 10, 15, 20, 25, 30, 35, 40, 45, 50 and/or not more than 99, 95, 90, 85, 80, 75, 70, 65, 60, 55, 50, 45, 40, 35, 30, 25, or 20 weight percent based on the total weight of the polar solid. In such embodiments, at least 20, 30, 40, 50, 60, 70, 80, 90, or 99 weight percent of the surfactant associated with the polar solid can be present within the pores of the polar solid.

In one or more embodiments, the surfactant comprises a cationic surfactant. In another embodiment, the surfactant is selected from the group consisting of cetyltrimethyl ammonium bromide ("CTAB"), cetyltrimethyl ammonium chloride ("CTAC"), and mixtures thereof.

Removal of Surfactants from the Polar Solids

In various embodiments, at least a portion of the surfactant contained within a surfactant-containing polar solid can be removed with the use of an extraction agent. In particular, the process described herein can include a step of contacting a surfactant-containing polar solid with an extraction agent under conditions sufficient to remove at least a portion of the surfactant from the polar solid. In one or more embodiments, the method described herein removes at least 1, 2, 4, 6, 8, 10, 15, 20, 25, 30, 35, 40, 45, 50, 55, 60, 65, 70, 75, 80, 85, 90, 95, 99, or 99.9 percent of the surfactant from the pores and surface of the polar solid. In another embodiment, the method described herein removes substantially all of the surfactant from the pores and surface of the polar solid. In other embodiments, the method described herein removes at least 1, 2, 4, 6, 8, 10, 15, 20, 25, 30, 35, 40, 45, 50, 55, 60, 65, 70, 75, 80, 85, 90, 95, 99, or 99.9 percent of the surfactant from the pores of the polar solid.

In one or more embodiments, the extraction agent comprises water, a salt, and, optionally, a polar organic compound.

In certain embodiments, the extraction agent comprises at least 0.1, 1, 5, 10, 15, 20, 25, 30, 35, 40, 45, or 50 and/or not more than 99.9, 99, 95, 90, 85, 80, 75, 70, 65, 60, 55, 50, 45, 40, 35, 30, 25, 20, 15, 10, 5, 1, or 0.1 percent by weight of water.

In certain embodiments, the extraction agent comprises at least 0.1, 0.5, 1, 2, 3, 4, 5, 6, 7, 8, 9, or 10 and/or not more than 40, 35, 30, 25, 20, 15, 10, 9, 8, 7, 6, 5, 4, or 3 percent by weight of a salt. Additionally or alternatively, at least 1, 2, 3, 4, or 5 and/or not more than 40, 35, 30, 25, 20, 15, or 10 equivalents of salt per equivalent of surfactant can be present in the extraction agent.

In one or more embodiments, the salt is at least partially soluble in water. In another embodiment, the salt comprises a cation that is capable of being substituted for a cation of the surfactant. In yet another embodiment, the salt is selected from the group consisting of alkaline earth metal salts, alkali metal salts, rare earth metal salts, sulfates, nitrates, transition metal salts, and combinations thereof. In still yet another embodiment, the salt is selected from the group consisting of potassium salts, magnesium salts, bromide salts, ammonium salts, sodium salts, chloride salts, aluminum salts, and combinations thereof. Specific salts that can be used include, for example, NaCl, NaNO$_3$, Na$_2$SO$_4$, (NH$_4$)$_2$SO$_4$, MgSO$_4$, Mg(NO$_3$)$_2$, CaCl$_2$, Ca(NO$_3$)$_2$, La(NO$_3$)$_3$, Ce(NO$_3$)$_4$, LaCl$_3$, CeCl$_4$, NH$_4$NO$_3$, AlCl$_3$, Al$_2$(SO$_4$)$_3$, and mixtures thereof.

In certain embodiments, the extraction agent comprises a polar organic compound that is capable of at least partially solubilizing the surfactant. In such embodiments, the extraction agent can comprise at least 1, 5, 10, 15, 20, 25, 30, 35, 40, 45, or 50 and/or not more than 99.9, 99, 95, 90, 85, 80, 75, 70, 65, 60, 55, 50, 45, 40, 35, 30, 25, 20, 15, or 10 percent by weight of the polar organic compound. In one or more embodiments, the polar organic compound comprises a polar organic solvent. In another embodiment, the polar organic compound is selected from the group consisting of an alcohol, THF, pyridine, ketone, aldehyde, amide, and combinations thereof. In yet another embodiment, the polar organic compound is selected from the group consisting of acetone, ethanol, methanol, isopropanal, THF, pyridine, ethyl acetate, DMF, and combinations thereof.

In certain embodiments, the polar organic compound is at least partially miscible with the water in the extraction agent. In one embodiment, the polar organic compound forms an azeotrope with at least a portion of the water in the extraction agent. In another embodiment, the polar organic compound forms a multiphasic liquid with at least a portion of the water in the extraction agent.

In various embodiments, the extraction agent is in the form of an azeotrope. In other embodiments, the extraction agent is in the form of a multiphasic liquid.

In various embodiments, the surfactant-containing polar solid is contacted with the extraction agent at atmospheric pressure and at a temperature that is at least room temperature. More particularly, the surfactant-containing polar solid can be contacted with the extraction agent at a temperature of at least 30, 35, 40, 45, 50, 55, 60, 65, 70, 75, or 80° C. In another embodiment, the surfactant-containing polar solid is contacted with the extraction agent at a temperature that does not exceed the boiling point of the constituent in the extraction agent with the lowest boiling point. In yet another embodiment, the surfactant-containing polar solid is contacted with the extraction agent at a pH of at least 1, 2, 3, 4, 5, 6, 6.5, 7, 7.5, or 8.0 and/or not more than 11.5, 11, 10.5, 10, 9, 8, 7, or 6. Additionally or alternatively, the surfactant-containing polar solid can be contacted with the extraction agent in the absence of an added acid. In still yet another embodiment, the surfactant-containing polar solid is contacted with the extraction agent over a time period of at least 1, 5, 10, 15, 20, 30, or 60 minutes and/or not more than 24, 18, 12, 11, 10, 9, 8, 7, 6, 5, 4, 3, or 2 hours. The surfactant-containing polar solid can be contacted with the extraction agent in an agitated vessel.

In certain embodiments, the contacting between the surfactant-containing polar solid and the extraction agent forms a treatment mixture comprising a treated polar solid and a surfactant-containing extraction agent. In one or more embodiments, the treatment mixture has a solid to solvent ratio of at least 0.005:1, 0.01:1, 0.05:1, 0.1:1, 0.5:1, 0.8:1, 1:1, 2:1, 3:1, 4:1, 5:1, 10:1, 15:1, or 20:1 and/or not more than 50:1, 40:1, 35:1, 30:1, 25:1, 20:1, or 15:1. In another embodiment, the treatment mixture comprises at least 0.5, 1, 5, or 10 and/or not more than 80, 70, 60, 50, 40, 35, 30, 25, 20, or 15 weight percent of solids.

In certain embodiments, the surfactant-containing extraction agent comprises at least a portion of the water, at least a portion of the salt, and at least a portion of the polar organic compound (if used) from the extraction agent used at the beginning of the process (i.e., the "initial extraction agent") and at least a portion of the surfactant initially present in the pores of the surfactant-containing polar solid. In one or more embodiments, the ratio of the weight concentration of the salt in the surfactant-containing extraction agent to the weight concentration of the salt in the initial extraction agent is at least 0.25:1, 0.3:1, 0.35:1, 0.4:1, 0.45:1, or 0.5:1 and/or not more than 0.99:1, 0.95:1, 0.9:1, 0.85:1, 0.8:1, 0.75:1, or 0.7:1. In the aforementioned weight ratios, the measured salt contents refer to the salt that is originally present in the initial extraction agent and does not account for any other salts that may be added subsequently during the process. In another embodiment, the ratio of the weight concentration of the salt cation in the treated polar solid to the weight concentration of the salt cation in the surfactant-containing polar solid is at least 1:1, 1.01:1, 1.05:1, 1.1:1, or 1.2:1 on a volatiles-free basis.

Subsequent to forming the treatment mixture, the treated polar solid and the surfactant-containing extraction agent can be separated to form a recovered polar solid and a spent extraction agent.

In one or more embodiments, the recovered polar solid has a surfactant content within its pores and on its surface that is at least 1, 2, 4, 5, 6, 8, 10, 15, 20, 25, 30, 35, 40, 45, 50, 55, 60, 65, 70, 75, 80, 85, 90, 95, or 99 percent by weight less than the surfactant content within the pores and on the surface of the surfactant-containing polar solid. In another embodiment, the weight ratio of the amount of the surfactant present in the pores of the recovered polar solid to the amount of the surfactant present in the pores of the surfactant-containing polar solid is not more than 0.9:1, 0.8:1, 0.7:1, 0.6:1, 0.5:1, 0.4:1, 0.3:1, 0.2:1, or 0.1:1. In yet another embodiment, the recovered polar solid has a surfactant content of not more than 50, 45, 40, 35, 30, 25, 20, 15, 10, or 5 weight percent based on the total weight of the recovered polar solid.

In certain embodiments, the process described herein causes little or no structural damage to the polar solid. For example, the recovered polar solid can have a crystalline content that is at least 30, 40, 50, 60, 70, 80, 90, 95, 99, 99.5, or 99.9 percent of the crystalline content of the surfactant-containing polar solid as measured by X-ray diffraction ("XRD"). In another embodiment, the process described herein causes little or no change in the porosity of the polar solid. For example, the recovered polar solid can have a total 20 to 80 Å diameter mesopore volume that is not more than 0.001, 0.005, 0.01, or 0.015 cc/g less than the 20 to 80 Å diameter mesopore volume of the surfactant-containing polar solid.

In certain embodiments, the recovered polar solid can be further subjected to drying in order to produce a dried polar solid. In more particular embodiments, the recovered polar solid can be subjected to calcination at a temperature of at least 300, 350, 400, 450, 500, 550, or 600° C.

In certain embodiments, at least a portion of the surfactant can be extracted and recovered from the spent extraction agent using methods known in the art. In such embodiments, at least a portion of the recovered surfactant may be used to introduce mesopores into various polar solids such as, for example, zeolites.

In various embodiments, the contacting and separating steps described above can be repeated using the recovered polar solid as the surfactant-containing polar solid. In such embodiments, the contacting and separating steps can be repeated at least 2, 3, 4, 5, 6, 7, 8, 9, 10, 11, 12, 13, 14, 15, 16, 17, 18, 19, or 20 times.

EXAMPLES

The following examples are intended to be illustrative of the present invention in order to teach one of ordinary skill in the art to make and use the invention and are not intended to limit the scope of the invention in any way.

Example 1

In this example, 250 g of a NaY zeolite (Zeolyst CBV100) was added to 1000 g of deionized water with stirring. After adjusting the pH of the slurry to 5.9 using 10% nitric acid, 720 g of 10% citric acid solution was pumped into the mixture for over an hour. After filtration and washing with deionized water, the solid was added into 1777 g of 6.5% CTAB solution and then 29% $NH_4OH$ was added to the mixture. After being heated at 80° C. for overnight, the mixture was filtered and washed to obtain the mesostructured Y zeolite. Thermogravimetric ("TGA") analysis showed that there was 26.3% by weight of CTAB in the mesostructure zeolite. The amount of CTAB in the zeolites was calculated by measuring the weight loss between 300 to 600° C. using TGA analysis. The weight loss between 300 to 600° C. was presumed to represent the amount of CTAB in the measured sample. The weight percentage of CTAB was calculated by dividing the weight loss between 300 to 600° C. by the weight of the mesostructured zeolite at 600° C. after correction is made by subtracting the weight loss observed at 300 to 600° C. divided by the weight of the corresponding non-mesostructured zeolite at 600° C.

Subsequently, 10 g of the dried mesostructured Y zeolite was added into two separate polypropylene bottles containing 90 g of deionized water and 90 g of an aqueous solution comprising 50% ethanol, respectively. Both bottles were at a pH of 8.4. Afterwards, 2 g of NaCl were then added to each of the bottles and then they were capped tight. Both mixtures were heated in an oven at 80° C. without agitation for overnight. The mixtures were then filtered and washed with hot deionized water a few times to remove the NaCl. The solids were then dried at 80° C. overnight. TGA analyses, under the same conditions for the starting meso structured zeolite, showed that there were 21.7% and 15.3% by weight of CTAB in the water and ethanol-based samples, respectively. In other words, this amounted to a 17.5% and 41.8% reduction in CTAB contents for the water and ethanol-based samples, respectively, after one extraction. It is evident that the salt water solution was able to separate a material amount of the surfactant from the zeolite without the need for a strong acid and that the presence of a polar organic solvent improves the extraction efficiency. Assuming the same extraction efficiency for the subsequent extractions, multiple extractions (e.g., 15 and 6 times for the water and ethanol-based samples, respectively) could effectively remove about 95% of the CTAB from the mesostructured zeolite.

Example 2

In this example, 150 g of NaY (Zeolyst CBV100) was added to 600 g of deionized water and 200 g of 30% CTAC with stirring. Subsequently, 432 g of 10% citric acid was then added dropwise into the slurry over 90 minutes. After filtration and washing, the solid was added to 450 g of deionized water with stirring and then a solution of 50% NaOH was added. The mixture was then heated without agitation in an 80° C. oven for overnight. Mesostructured zeolite Y was obtained after filtration, washing, and drying. The mesostructured zeolite Y contained 25.4% by weight of CTAC based on the TGA analysis described in Example 1.

Subsequently, 5 g of the mesostructured zeolite Y was added to four different polypropylene bottles containing, respectively, 20 g of 50% ethanol in water and 1.25 g of NaCl, 95 g of 50% ethanol in water and 1.25 g of NaCl, 95 g of 75% ethanol in water and 0.25 g of NaCl, and 95 g of 75% ethanol in water and 1.25 g of NaCl. The bottles were then capped and heated in an oven at 80° C. overnight without agitation. The mixtures were then filtered wand washed with hot deionized water to remove undissolved NaCl. TGA analyses showed 15.1%, 12.5%, 11.5%, and 8.4% by weight of CTAC remaining in the mesostructured zeolites, which correspond to 40.6%, 52.8%, 50.8%, and 66.9% efficiency in CTAC removal, respectively. The results show that ethanol concentration, solids content, and the amount of NaCl (or the ratio of salt to zeolite) have strong effects on the separation efficiency. Higher ethanol concentration, lower solid content, and higher salt to zeolite ratio favor higher extraction efficiency.

Example 3

In this example, another mesostructured zeolite Y was prepared using the procedure described in Example 2. The mesostructured zeolite Y contained 16.2% by weight of CTAC as determined by TGA analysis.

Subsequently, 30 g of the dried mesostructure zeolite Y was added into a round-bottom flask containing 270 g of an isopropanol-water azeotrope (~87% isopropanol) and 12 g of NaCl. The flask was then equipped with a water-cooled condenser and heated at refluxing for 2 hours. The mixture was then filtered and washed with deionized water to remove undissolved NaCl. The process was then repeated another 3 times. The final solid showed 1.2% by weight of CTAC as determined by TGA analysis, which corresponds to a CTAC removal efficiency of 92.6%. This example shows that use of an azeotrope simplifies recovery of both the surfactant and solution, as the azeotrope may be evaporated to leave behind a surfactant-rich solid which may be recycled and reused. Consequently, the azeotrope may also be recycled and subsequently reused.

Example 4

In this example, a mesostructured X zeolite was made from a NaX zeolite following a similar procedure as described in Example 2. The mesostructured X zeolite contained 28.4% by weight of CTAC as determined by TGA analysis.

Subsequently, 10 g of the mesostructured X zeolite was added into a round bottom flask that contained 90 g of an isopropanol-water azeotrope (~87% isopropanol) and 12 g of NaCl. The flask was then equipped with a water-cooled condenser and heated at refluxing for 2 hours. The mixture was then filtered and washed with deionized water to remove undissolved NaCl. The process was then repeated another 3 times. The final solid showed 0.4% by weight of CTAC as determined by TGA analysis, which corresponds to a CTAC removal efficiency of 98.6%.

Example 5

In this example, a mesostructured A zeolite was made from a NaA zeolite following a similar procedure as described in Example 2. The mesostructured A zeolite contained 33.2% by weight of CTAC as determined by TGA analysis.

Subsequently, 10 g of the mesostructured A zeolite was added into a round bottom flask that contained 90 g of an isopropanol-water azeotrope (~87% isopropanol) and 10 g of NaCl. The flask was then equipped with a water-cooled condenser and heated at refluxing for 2 hours. The mixture was then filtered and washed with deionized water to remove undissolved NaCl. The process was then repeated another 3 times. The final solid showed 1.5% by weight of CTAC as determined by TGA analysis, which corresponds to a CTAC removal efficiency of 95.5%

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

"Y" represents a faujasite zeolite comprising at least 1.75 moles of silicon per mole of aluminum in its crystal structure. This term also includes the different exchange ion forms of Y.

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophosphates, and titanosilicates.

What is claimed is:

1. A method for removing a surfactant from a polar solid, said method comprising: contacting a surfactant-containing porous polar solid with an initial extraction agent under conditions sufficient to remove at least a portion of a surfactant from the pores of said surfactant-containing polar solid, wherein said initial extraction agent comprises water and a salt, wherein said initial extraction agent comprises a polar organic compound that is capable of at least partially solubilizing the surfactant, wherein said polar organic compound is selected from the group consisting of THF, one or more alcohols, one or more pyridines, one or more ketones, one or more aldehydes, one or more amides, and combinations thereof, wherein said salt is selected from the group consisting of NaCl, NaNO$_3$, Na$_2$SO$_4$, (NH$_4$)$_2$SO$_4$, MgSO$_4$, Mg(NO$_3$)$_2$, CaCl$_2$, Ca(NO$_3$)$_2$, La(NO)$_3$, Ce(NO$_3$)$_4$, LaCl$_3$, CeCl$_4$, AlCl$_3$, Al$_2$(SO$_4$)$_3$, and mixtures thereof.

2. The method of claim 1 wherein said surfactant-containing polar solid comprises a molecular sieve having cation exchange capacity.

3. The method of claim 1 wherein said surfactant-containing polar solid is selected from the group consisting of aluminates, silicates, zeolites, and combinations thereof.

4. The method of claim 1 wherein said surfactant-containing polar solid comprises a zeolite.

5. The method of claim 1 wherein said polar organic compound is selected from the group consisting of acetone, ethanol, methanol, isoproponal, THF, pyridine, ethyl acetate, DMF, and combinations thereof.

6. The method of claim 1 wherein said initial extraction agent comprises at least 5 percent by weight of said polar organic compound.

7. The method of claim 1 wherein said initial extraction agent is in the form of an azeotrope.

8. The method of claim 1 wherein said surfactant comprises a cationic surfactant.

9. The method of claim 1 wherein at least 20 weight percent of said surfactant associated with said surfactant-containing polar solid is present within the pores of said surfactant-containing polar solid.

10. The method of claim 1 wherein said method removes at least 15 percent by weight of said surfactant initially contained in the pores of said surfactant-containing polar solid.

11. The method of claim 1 wherein said contacting occurs at a pH of at least 7.

12. The method of claim 1 wherein said contacting occurs in the absence of an added acid.

13. The method of claim 1 wherein said contacting forms a treated polar solid and a surfactant-containing extraction agent, wherein said method further comprises separating said treated polar solid from said surfactant-containing extraction agent to thereby provide a recovered polar solid and a spent extraction agent.

14. The method of claim 13 wherein said recovered polar solid has a crystalline content that is at least 30 percent of the crystalline content of said surfactant-containing polar solid as measured by X-ray diffraction ("XRD"); wherein said recovered polar solid has a total 20 to 80 Å diameter mesopore volume that is not more than 0.015 cc/g less than the 20 to 80 Å diameter mesopore volume of said surfactant-containing polar solid.

15. The method of claim 13 wherein the weight ratio of the amount of said surfactant present in the pores of said recovered polar solid to the amount of said surfactant present in the pores of said surfactant-containing polar solid is not more than 0.9:1.

16. The method of claim 13 wherein the weight ratio of the amount of said surfactant present in the pores of said recovered polar solid to the amount of said surfactant present in the pores of said surfactant-containing polar solid is not more than 0.6:1.

17. The method of claim 1 wherein said contacting forms a surfactant-containing extraction agent comprising at least a portion of said water, at least a portion of said salt, and at least a portion of said surfactant initially present in the pores of said surfactant-containing polar solid.

18. The method of claim 17 wherein the ratio of the weight concentration of said salt in said surfactant-containing extraction agent to the weight concentration of said salt in said initial extraction agent is at least 0.25:1.

19. The method of claim 1 wherein said surfactant was previously used to form mesopores in said surfactant-containing polar solid.

20. The method of claim 1 wherein said surfactant-containing polar solid has a total 20 to 80 Å diameter mesopore volume of at least 0.05 cc/g.

21. A method for removing a surfactant from a mesoporous zeolite, said method comprising:
(a) contacting a surfactant-containing mesoporous zeolite with an initial extraction agent under conditions sufficient to remove at least a portion of a cationic surfactant from the pores of said surfactant-containing mesoporous zeolite to thereby provide a treated mesoporous zeolite and a surfactant-containing extraction agent, wherein said initial extraction agent comprises water, a salt, and a polar organic compound, wherein said polar organic compound is capable of at least partially solubilizing said cationic surfactant, wherein said surfactant-containing extraction agent comprises at least a portion of said water, at least a portion of said salt, at least a portion of said polar organic compound, and at least a portion of said cationic surfactant initially present in the pores of said surfactant-containing mesoporous zeolite; and
(b) separating said treated mesoporous zeolite from said surfactant-containing extraction agent to thereby provide a recovered mesoporous zeolite and a spent extraction agent, wherein the weight ratio of the amount of said cationic surfactant present in the pores of said recovered mesoporous zeolite to the amount of said cationic surfactant present in the pores of said surfactant-containing mesoporous zeolite is not more than 0.9:1.

22. The method of claim 21 wherein said polar organic compound comprises a polar organic solvent selected from the group consisting of acetone, ethanol, methanol, isoproponal, THF, pyridine, ethyl acetate, DMF, and combinations thereof.

23. The method of claim 21 wherein said salt is selected from the group consisting of potassium salts, ammonium salts, sodium salts, chloride salts, magnesium salts, bromide salts, aluminum salts, and combinations thereof.

24. The method of claim 21 wherein said recovered mesoporous zeolite has a total surfactant content of not more than 30 weight percent based on the total weight of said recovered mesoporous zeolite.

25. The method of claim 21 wherein said method removes at least 20 percent of said surfactant initially contained in the pores of said surfactant-containing mesoporous zeolite.

26. The method of claim 21 wherein said contacting occurs at a pH of at least 7.

27. The method of claim 21 wherein said surfactant-containing mesoporous zeolite is a mesostructured zeolite.

28. The method of claim 21 further comprising repeating said steps (a) and (b) with said recovered mesoporous zeolite as said surfactant-containing mesoporous zeolite.

29. The method of claim 21 wherein said separating of step (b) yields an extracted surfactant, further comprising recovering at least a portion of said extracted surfactant.

30. The method of claim 21 wherein said recovered mesoporous zeolite has a crystalline content that is at least 70 percent of the crystalline content of said surfactant-containing mesoporous zeolite as measured by X-ray diffraction ("XRD"); wherein said recovered mesoporous zeolite has a total 20 to 80 Å diameter mesopore volume that is not more than 0.01 cc/g less than the 20 to 80 Å diameter mesopore volume of said surfactant-containing mesoporous zeolite.

31. The method of claim 21 wherein the weight ratio of the amount of said surfactant present in the pores of said recovered mesoporous zeolite to the amount of said surfactant present in the pores of said surfactant-containing mesoporous zeolite is not more than 0.7:1.

32. The method of claim 21 wherein the ratio of the weight concentration of said salt in said surfactant-containing extraction agent to the weight concentration of said salt in said initial extraction agent is not more than 0.9:1.

\* \* \* \* \*